United States Patent

Zolotov et al.

Patent Number: 5,853,792
Date of Patent: Dec. 29, 1998

[54] LOW SODIUM EDIBLE SALT COMPOSITION AND PROCESS FOR ITS PREPARATION

[75] Inventors: Shaul Zolotov, Lehavim; Oleg Braverman, Beer-Sheva; Margarita Genis, Arad; David Biale, Kfar Miamon, all of Israel

[73] Assignee: Dead Sea Works Ltd, Beer Sheva, Israel

[21] Appl. No.: 798,254

[22] Filed: Feb. 11, 1997

[30] Foreign Application Priority Data

May 28, 1996 [IL] Israel .................................. 118460

[51] Int. Cl.$^6$ ...................................... A23L 1/237
[52] U.S. Cl. .............................. 426/649; 426/96; 426/97; 426/506; 426/806
[58] Field of Search ..................... 426/649, 806, 426/506, 96, 97

[56] References Cited

U.S. PATENT DOCUMENTS

| | | |
|---|---|---|
| 2,596,333 | 5/1952 | Halpern et al. .................. 426/649 |
| 2,824,008 | 2/1958 | Perri ................................. 426/649 |
| 4,243,691 | 1/1981 | Mohlenkamp, Jr. et al. . |
| 4,963,387 | 10/1990 | Nakagawa et al. ............. 426/649 |

FOREIGN PATENT DOCUMENTS

| | | |
|---|---|---|
| 0059363 | 9/1982 | European Pat. Off. . |
| 0124254 | 11/1984 | European Pat. Off. ....... 426/649 |
| 0125021 | 11/1984 | European Pat. Off. . |
| 3418644 | 11/1985 | Germany . |
| 01304860 | 12/1989 | Japan . |
| 40-4108358 | 4/1992 | Japan ................. 426/649 |
| 4-187061 | 7/1992 | Japan ................. 426/649 |

*Primary Examiner*—Helen Pratt
*Attorney, Agent, or Firm*—Sprung Kramer Schaefer & Briscoe

[57] ABSTRACT

A low sodium edible salt composition comprises, based on dry weight of ingredients, 0–50% NaCl, 45–99.5% KCl and at least 0.5% additives, which comprise at least one edible nucleotide monophosphate salt and at least one member other than the nucleotide monophosphate salt selected from the group consisting of low organic acid, low organic acid salt, phosphoric acid, phosphate salt, a magnesium salt, sugar and burnt sugar. The additives have the effect of countering the bitter taste of KCl.

9 Claims, 1 Drawing Sheet

LOW SODIUM EDIBLE SALT COMPOSITION AND PROCESS FOR ITS PREPARATION

FIELD OF THE INVENTION

The present invention concerns edible mineral salt mixtures. More specifically, the present invention concerns mixtures with a low sodium content.

In the following, the term "edible salt" will be used to refer generally to salt compositions used in food, in both domestic use or in the food industry. The term "low sodium edible salt" will be used to denote such salt compositions with a low sodium content as compared to standard sodium-based edible salts.

BACKGROUND OF THE INVENTION AND PRIOR ART

Sodium chloride is a major constituent of regular edible salts and as a result of wide use of edible salts in food seasoning at home as well as in the food industry, the sodium intake by individuals in the western world far exceeds recommended dosage. This overload of sodium has been associated with some adverse physiological effects including hypertension and renal complications.

It has long been proposed to use in food low sodium edible salts, in which potassium chloride replaces some of the sodium chloride. However, potassium salt has a different, bitter taste which is regarded as unpleasant by most individuals.

Many attempts have been made to produce low sodium edible salts with some of the ingredients designed to create an overall sensation resembling that of the standard, high sodium edible salt. Such low sodium edible salts have been disclosed in Australian Patent Application AU-A-51225/85, Japanese Patent Application, JP-88/134592, and in U.S. Pat. No. 4,068,000.

GENERAL DESCRIPTION OF THE INVENTION

It is an object according to the invention to provide a low-sodium edible salt.

It is another object of the present invention to provide a low sodium, high potassium edible salt in which the bitter taste of potassium chloride is countered by the addition of additives.

It is another object of the invention to provide a process for the preparation of a low sodium table salt.

In the following text, the relative concentration of the various ingredients in the edible salt will be given as percent (%), meaning the number of dry-weight units of ingredients per 100 dry-weight units of entire composition (w/w). Obviously, if the salt composition of the invention is mixed with water, while the relative concentration will not change, the actual concentration in the resulting solution will be less.

The present invention provides, by a first of its aspects, a low sodium edible salt composition comprising 0–80% NaCl, 20–99.5% KCl and at least 0.5% additives which comprise at least one edible nucleotide monophosphate salt and at least one member other than said nucleotide monophosphate salt selected from the group consisting of low organic acid, low organic acid salt, phosphoric acid, phosphate salt, a magnesium salt, sugar and burnt sugar.

Preferred edible nucleotide monophosphate salts are salts of 5-inosinate monophosphate (IMP) and 5-guanylate monophosphate (GMP). Particular examples are disodium salts of both IMP and GMP.

Examples of low organic acids are tartaric acid, lactic acid, citric acid, gluconic acid and acetic acid, citric acid being currently preferred.

Phosphoric acid salts are preferably mono- or dihydrogen phosphate. A currently preferred phosphoric acid salt is sodium pyrophosphate ($Na_2H_2P_2O_7$).

Magnesium salt may, for example, be magnesium sulphate ($MgSO_4.7H_2O$) or magnesium chloride ($MgCl_2.6H_2O$). For use as a standard table salt $MgSO_4$ is preferred since $MgCl_2$ is hygroscopic, i.e. it absorbs water.

Burnt sugars include sugars with an enolone group such as furaneol, cyclotene, maltol, isomaltol, norfuraneal, maple lactone and others.

Preferred ranges of KCl and NaCl are as follows:

KCl—45–75%

NaCl—20–50%

The metal ions (sodium, potassium and magnesium) may be included in the compositions as single or double salts.

Typical concentration range of said additives are 0.5–15%, preferred range being 0.6–6.0%. Preferred concentration range for each of the different additives are as follows:

Nucleotide monophosphate derivatives—0.05–0.35%, 0.15–0.31% being particularly preferred;

Low organic acids or salts thereof—0.1–0.4%;

Phosphoric acid salt—1.5–3.5%;

Sugar or burnt sugar—0.001–0.005%, about 0.003% being particularly preferred.

While the composition of the invention may also be provided as a concentrated solution it is preferably provided as a dry composition. In order to avoid caking of such a dry composition, anti-caking agents such as sodium ferrocyanide ($Na_4Fe(CN)_6.10H_2O$) are preferably added. In order to improve the free flowing properties a suitable agent therefore is preferably added, e.g. basic magnesium carbonate.

One manner of obtaining a dry composition is to mix the various ingredients which are a priori in a dry form. However, various ingredients have different grain size and it was found that following agitation there is some segregation of the grains in the dry mixture based on their size. While this may not be a serious problem in the case, for example, of industrial use where large quantities and at times an entire batch are used at once, or where means for mixing the salt composition prior to use are provided, the issue of grain segregation may be a problem in a composition intended for domestic use as a seasoning.

Another manner of preparing the salt composition is to mix all the ingredients in solution and then dry the solution by means of vacuum evaporation or any other drying technique. A suitable way of producing the salt composition, especially on an industrial scale, is continuous crystallization resulting in wet mixture with the same ratio of components that is in the feed solution.

A preferred preparation method of the composition is spraying of a water solution of additives, other than those with a low water solubility (e.g. disodium acid pyrophosphate), on the potassium chloride crystals followed by addition of the low soluble additives in a dry form and subsequent drying. This method is novel per se and constitutes an aspect of the invention. The dry sodium chloride and some additives may then be mixed and precoated by spraying potassium chloride.

By a preferred embodiment of this latter aspect, the spraying is performed after filtration or centrifugation of potassium chloride crystallized from the brine or on dry potassium chloride. The drying of moistened potassium chloride is typically achieved by spin or fluidized bed drying process.

The different additives have different solubilities and accordingly are preferably sprayed in different spraying stages. For example, the nucleotide monophosphates are sprayed in a first spraying stage and the organic and phosphoric acids at a second spraying stage.

The invention will now be illustrated by the following Examples of salt compositions in accordance with the invention, with occasional reference to the annexed drawing:

EXAMPLES

Example 1

Figure 1:
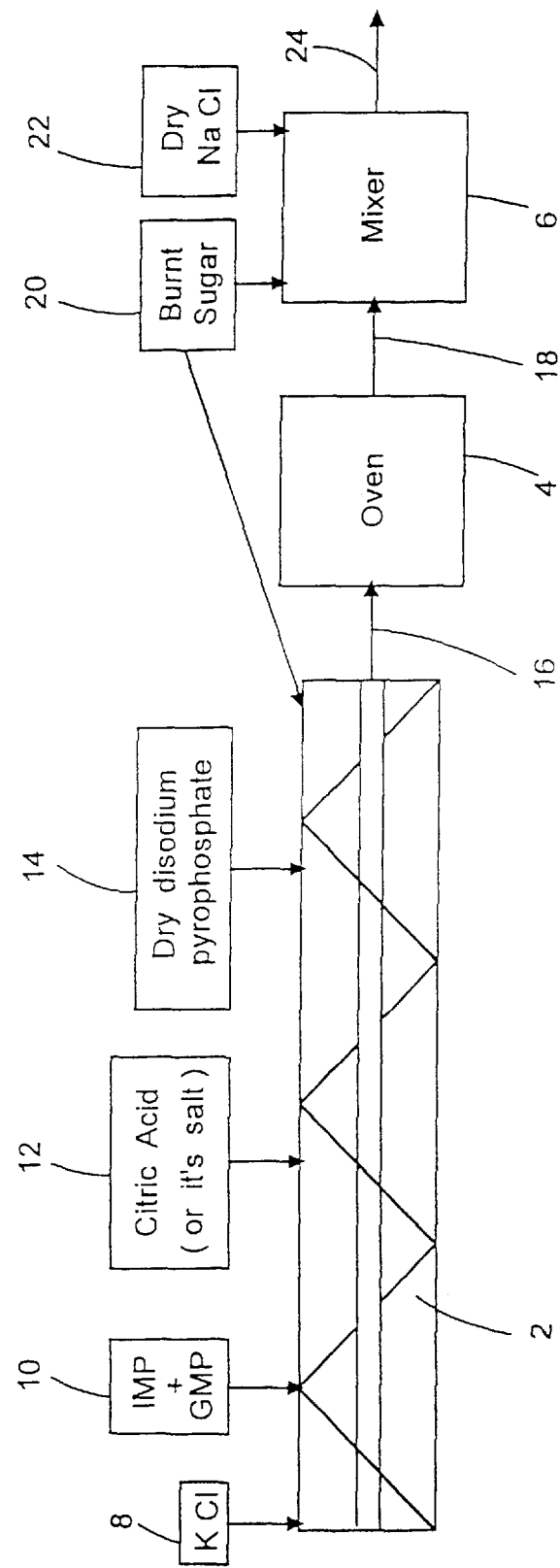
FIG. 1 is a scheme of illustrating the manner of preparation of the composition exemplified in Example 1.

Salt compositions of the invention comprising KCl, NaCl, IMP, GMP, citric acid, disodium pyrophosphate and burnt sugar, were prepared. Three different types of compositions comprising these ingredients, of different amount of each, were prepared, as listed in the following Table 1.

TABLE 1

|  | % | % | % |
| --- | --- | --- | --- |
| KCl | 66.327 | 56.817 | 47.307 |
| NaCl | 30 | 40 | 50 |
| IMP | 0.075 | 0.064 | 0.053 |
| GMP | 0.225 | 0.184 | 0.153 |
| Citric Acid | 0.187 | 0.160 | 0.133 |
| Disodium Pyrophosphate | 2.892 | 2.480 | 2.063 |
| Burnt Sugar | 0.0030 | 0.0030 | 0.0030 |

A scheme illustrating the manner of preparation of the composition is shown in FIG. 1. The components of the system used in the preparation includes a screw-mixer 2, a fluidized bed drier 4, and a spin mixer 6. Wet KCl 8 is added into the screw-mixer 2 and then a concentrated water solution of IMP and GMP is sprayed onto the wet KCl at spraying stage 10. At next stage, a concentrated solution of citric acid or its salt is sprayed onto the mixture at stage 12 and finally a dry disodium pyrophosphate is added to the mixture at stage 18. The resulting perfectly mixed wet composition 16 is then fed into fluidized bed drier 4 and dried at about 125° C. The dried composition 18 is then fed into spin mixture 6 where a concentrated solution of burnt sugar 20 is sprayed onto the dry mixture and finally added is a dry NaCl mixture 22. The ensuing mixture 24 does not require any additional drying as the amount of water added with composition 16 is small.

As an alternative, it is possible to feed burnt sugar also into the composition in screw-mixer 2.

Example 2

Salt compositions of the invention comprising the same ingredients as in Example 1 but with the replacement of citric acid by tri-potassium citrate. Three different types of compositions differing from one another by the concentration of various ingredients were prepared, as listed in the following Table 2.

TABLE 2

|  | % | % | % |
| --- | --- | --- | --- |
| KCl | 66.387 | 56.857 | 47.337 |
| NaCl | 30 | 40 | 50 |
| IMP | 0.136 | 0.117 | 0.097 |
| GMP | 0.136 | 0.117 | 0.097 |
| Tri-Potassium Citrate | 0.333 | 0.285 | 2.36 |
| Disodium Pyrophosphate | 2.72 | 2.33 | 1.94 |
| Burnt Sugar | 0.0030 | 0.0030 | 0.0030 |

The preparation procedure of the composition was as described above in Example 1.

Example 3

Compositions with the same ingredients as in Examples 1 and 2 but with the citric acid and the tri-potassium citrate, respectively being replaced by tri-sodium citrate, were prepared. Similar as in Examples 1 and 2, three different types of compositions differing from one another by the concentration of the various ingredients were prepared, and this is in the following Table 3.

TABLE 3

|  | % | % | % |
| --- | --- | --- | --- |
| KCl | 66.387 | 56.857 | 47.337 |
| NaCl | 30 | 40 | 50 |
| IMP | 0.136 | 0.117 | 0.097 |
| GMP | 0.136 | 0.117 | 0.097 |
| Tri-Potassium Citrate | 0.286 | 0.250 | 0.204 |
| Disodium Pyrophosphate | 2.762 | 2.366 | 1.972 |
| Burnt Sugar | 0.0030 | 0.0030 | 0.0030 |

The manner of the preparation of the composition was as described in Example 1.

Example 4

A salt composition in accordance with the invention was prepared comprising KCl, NaCl, IMP, magnesium sulfate and burnt sugar. Three different compositions differing from one another by the concentrations of the various ingredients, were prepared as listed in the following Table 4.

TABLE 4

|  | % | % | % |
| --- | --- | --- | --- |
| KCl | 68.917 | 49.027 | 49.137 |
| NaCl | 30 | 40 | 50 |
| IMP | 0.286 | 0.250 | 0.204 |
| $MgSO_4 \cdot 7H_2O$ | 0.504 | 0.43 | 0.366 |
| Burnt Sugar | 0.0030 | 0.0030 | 0.0030 |

The preparation procedure was similar to that described in Example 1. Briefly, concentrated water solution of IMP and $MgSO_4$ was sprayed on a wet KCl mixture in a screw-mixture. Resulting mixed with composition was fed into a fluidized bed drier and dried at 125° C. The dried composition was then fed into a spin mixture where a concentrated solution of burnt sugar was sprayed thereon, and finally dry NaCl was added.

Example 5

A composition according to the invention comprising the following ingredients was prepared.

| | |
|---|---|
| KCl | 71.1% |
| NaCl | 25% |
| IMP | 0.08% |
| GMP | 0.23% |
| Citric Acid | 0.2% |
| Disodium Pyrophosphate | 3.1% |

The manner of preparation was similar to that described in Example 1.

Example 6

The salt composition in accordance with the invention comprising the following ingredients was prepared.

| | |
|---|---|
| KCl | 71.13% |
| NaCl | 25% |
| IMP | 0.146% |
| GMP | 0.146% |
| Tri-Potassium Citrate | 0.357% |
| Sodium Pyrophosphate | 2.92% |

The manner of preparation was as described in Example 1.

Example 7

The salt composition in accordance with the invention comprising the following ingredients was prepared.

| | |
|---|---|
| KCl | 71.15% |
| NaCl | 25% |
| IMP | 0.146% |
| GMP | 0.146% |
| Tri-Sodium Citrate | 0.307% |
| Disodium Pyrophosphate | 2.96% |

The manner of preparation was as described in Example 1.

Example 8

The salt composition in accordance with the invention comprising the following ingredients was prepared.

| | |
|---|---|
| KCl | 73.86% |
| NaCl | 25% |
| IMP | 0.307% |
| Magnesium sulfate | 0.54% |

The manner of preparation was as described in Example 1.

Example 9

The salt composition in accordance with the invention comprising the following ingredients was prepared.

| | |
|---|---|
| KCl | 56.85% |
| NaCl | 40% |
| IMP | 0.117% |
| GMP | 0.117% |
| Tri-Sodium Citrate | 0.250% |
| Disodium Pyrophosphate | 2.366% |
| Maltol | 0.003% |

The manner of preparation was as described in Example 1.

Example 10

The salt compositions of Examples 1 through 9 were subjected to a tasting assay in comparison to the following two salt mixtures:

Mixture 1: 50% NaCl and 50% KCl

Mixture 2: 25% NaCl and 75% KCl.

Each of the inventive salt compositions as well as each of Mixtures 1 and 2 were dissolved in water (2% solution), and these solutions were then tasted by a panel of naive individuals.

In all cases, the compositions of the invention were given a higher taste score to the above Mixtures 1 and 2.

We claim:

1. A low sodium edible salt composition comprising, based on dry weight of ingredient, 0–50% NaCl, 45–99.5% KCl and at least 0.5% additives, which comprise at least one edible nucleotide monophosphate salt, a burnt sugar, and at least one member other than said nucleotide monophosphate salt selected from the group consisting of low organic acid, low organic acid salt, phosphoric acid, phosphate salt, a magnesium salt and sugar.

2. A composition according to claim 1, wherein the nucleotide monophosphate is IMP or GMP.

3. A composition according to claim 1, wherein the low organic acid is selected from the group consisting of citric acid, tartaric acid, lactic acid, gluconic acid and acetic acid.

4. A composition according to claim 1, wherein the phosphoric acid is sodium pyrophosphate.

5. A composition according to claim 1, comprising 45–75% KCl and 20–50% NaCl.

6. A composition according to claim 1, comprising 0.5–15% of said additive.

7. A composition according to claim 6 comprising 0.6–6.0% of said additives.

8. A composition according to claim 1, wherein the burnt sugar is maltol.

9. A process for preparing a low-sodium edible salt composition of claim 1, comprising:

(a) spraying said additives, other than magnesium salt on wet KCl granules;

(b) drying the KCl granules; and (c) mixing the dried KCl granules with NaCl and where said additives comprise the magnesium salt, mixing the dried KCl granules also with this salt.

* * * * *